United States Patent [19]
Hirota et al.

[11] Patent Number: 5,762,673
[45] Date of Patent: Jun. 9, 1998

[54] METHOD OF MANUFACTURING GLASS OPTICAL ELEMENTS

[75] Inventors: Shin-Ichiro Hirota; Tadayuki Fujimoto; Hiroaki Takahara, all of Tokyo, Japan

[73] Assignees: Hoya Precision Inc., Nagano; Hoya Corporation, Tokyo, both of Japan

[21] Appl. No.: 788,965

[22] Filed: Jan. 24, 1997

[51] Int. Cl.⁶ .......................... C03B 35/00; C03B 21/00; C03B 9/00; C03B 11/00
[52] U.S. Cl. .......................... 65/25.1; 65/63; 65/64; 65/66; 65/84; 65/122; 65/127; 65/182.2
[58] Field of Search .................. 65/21.3, 25.1, 65/63, 64, 66, 83, 84, 102, 122, 127, 182.2, 303, 305

[56] References Cited

U.S. PATENT DOCUMENTS

| | | | |
|---|---|---|---|
| 1,739,519 | 12/1929 | Peiler | 65/25.1 |
| 3,961,927 | 6/1976 | Alderson et al. | 65/182.2 |
| 4,734,118 | 3/1988 | Marechal et al. | 65/275 |
| 5,322,541 | 6/1994 | Shimizu et al. | 65/66 |
| 5,340,374 | 8/1994 | Komiyama et al. | 65/64 |
| 5,344,476 | 9/1994 | Tomida | 65/102 |

FOREIGN PATENT DOCUMENTS

| | | |
|---|---|---|
| 59-203732 | 11/1984 | Japan . |
| 2-14839 | 1/1990 | Japan . |
| 2-258640 | 10/1990 | Japan . |
| 3-60435 | 3/1991 | Japan . |
| 5078134 | 7/1993 | Japan . |
| 6-144845 | 5/1994 | Japan . |
| 6092645 | 7/1994 | Japan . |
| 6-340430 | 12/1994 | Japan . |
| 94-340430 | 12/1994 | Japan . |
| 7-10556 | 1/1995 | Japan . |

Primary Examiner—Peter Chin
Assistant Examiner—Jacqueline A. Ruller
Attorney, Agent, or Firm—Sughrue, Mion, Zinn, Macpeak & Seas, PLLC

[57] ABSTRACT

In a method of manufacturing glass optical elements at high operational efficiency, a mass of molten glass which is dropped down is cut at a first step by a wind blast into a sequence of glass gobs each of which is received by a gas stream spouted from a lower portion. Each glass gob is kept afloat with a gas stream spouted to be adjusted to a temperature corresponding to a glass viscosity between $10^{5.5}$ and $10^9$ poises. Thereafter, the glass gob is pressed in a third step by the use of a pair of forming dies kept at a temperature which corresponds to a glass viscosity between $10^8$ and $10^{12}$ poises and which is lower than the temperature of the glass gob. During the third step, the forming dies are cooled to a temperature lower than the temperature corresponding to a glass viscosity of $10^{13.4}$ poises with the glass gob kept within the forming dies and are thereafter opened to release a shaped article from the forming dies. A plurality of the glass gobs may be simultaneously processed in parallel through the second and the third steps so that a gob supply pace at the first step is matched with each pace of the second and the third steps.

16 Claims, 6 Drawing Sheets

METHOD OF MANUFACTURING GLASS OPTICAL ELEMENTS

BACKGROUND OF THE INVENTION

This invention relates to a method of manufacturing a glass optical element such as a lens to be used in an optical instrument and, more particularly, to a method of obtaining a glass optical element by directly pressing molten glass before the molten glass is cooled down to a room temperature. The method will be called a direct pressing method.

The method of this invention can improve the efficiency of manufacturing the glass optical element by shortening a time required for steps carried out in the direct pressing method.

A recent trend has been directed to a method of manufacturing a glass optical element only by pressing a glass gob without a grinding and polishing process or step carried out after the pressing step. Practically, the method, however, must resort to a procedure which comprises the steps of pre-processing a glass raw material into preforms which have a prescribed shape and volume and a smooth surface, heating each preform together with a forming die unit or separately from the forming die unit, and thereafter press forming each preform heated.

The prior art pertaining to the precision pressing method is disclosed in JP-A-07-10556 (hereinafter referred to as "Prior Art 1").

Prior Art 1 resides in a method of forming an optical element, with forming dies and a glass raw material controlled under the optimum temperature conditions such that the shaped article of glass may be prevented from being broken or deformed.

This method does not deserve high esteem in terms of operational efficiency because the preformed glass raw material should be prepared and reheated.

Recently, as an approach to the production of a glass optical element at a reduced cost attainable by removing such steps as a reheating step, attempts have been made about directly press forming molten glass.

JP-A-02-258640 (hereinafter referred to as "Prior Art 2") discloses a method which comprises a step of receiving molten glass with a first hot working jig in a non-oxidizing atmosphere. In this method, the first hot working jig is thereafter inverted with the received molten glass to transfer the molten glass to a second hot working jig. Subsequently, the molten glass is thermally deformed into a shaped article of optical glass by the second hot working jig. The shaped article is thereafter pressed into a pressed article by a forming die unit which is heated. With this method, a furrowed surface which is called a "dendritic pattern" inevitably appears on the glass gob. This is because the molten glass is rapidly cooled on reception of the molten glass on the first hot working jig kept at a relatively low temperature. Contemplation has been made about diminishing the furrows by causing the glass gob to be inverted and transferred into the second hot working jig and kept at an elevated temperature enough to cause thermal deformation of glass for a prescribed period by subsequently press forming the glass gob with the second hot working jig (lower die) and a press forming die (upper die).

JP-A-03-60435 (hereinafter referred to as "Prior Art 3") discloses a method which comprises receiving molten glass with a first hot working jig thereby manufacturing a glass gob, attaching the glass gob fast to a second hot working jig and inverting the glass gob in conjunction therewith, allowing the glass gob to be thermally deformed by dint of the surface tension thereof and consequently manufacturing a shaped article of optical glass, and subsequently press forming the shaped article.

JP-A-06-144845 (hereinafter referred to as "Prior Art 4") discloses a method which comprises the steps of supplying a prescribed amount of molten glass to a receiving dish, then heating the molten glass on the receiving dish until it acquires a viscosity of not more than $10^5$ poises, rendering the molten glass into a flat shape, and supplying the molten glass from the receiving dish in an untouched state (by inverting the receiving dish as described in a working example) to a lower die.

JP-A-06-340430 (hereinafter referred to as "Prior Art 5") discloses a method for the production of a glass optical element. This method comprises a step of dropping molten glass through an orifice, a step of receiving the dropping molten glass onto a first die member composed of a pair of dies which are horizontally opened and closed and which have porous surfaces through which a gas is spouted. A preformed shaped article of glass optical element is formed by the split dies. Subsequently, the preformed shaped article of glass optical element is dropped down onto a second die member by opening the first die member in the horizontal direction and press formed by the second die member into a glass optical element.

In any event, the direct pressing method for the production of a glass optical element fundamentally comprises the following three steps.

(1) A step of forming a glass gob (namely, a mass of glass) of a prescribed amount from molten glass (the shape of the glass gob is also adjusted at the step).

(2) A step of adjusting the temperature and viscosity of the glass gob.

(3) A step of press forming the glass gob and releasing the produced shaped article of glass from the forming dies.

The step of (1) of forming the glass gob is generally implemented by allowing the molten glass to flow down through an outlet pipe and receiving the dropped molten glass with a receiving die. The time required for forming one glass gob is determined by the diameter of the outlet pipe and the viscosity, surface tension, etc. of the glass as well as the weight of the gob. The time falls within a range between 2 and 10 seconds when the weight of the gob is not more than about 5 g.

The time required for the step of (3) is generally notably long as compared with the time mentioned above, a conceivable solution of the problem of this wide difference of time between the two steps may consist in slowing the speed of production of the glass gob so much as to eliminate the difference of time between the two steps under discussion. Actually, however, it is difficult to slow notably the speed of production of the gob because the speed of downward flow of the molten glass is fixed by the diameter of the outlet pipe and the viscosity, surface tension, etc. of the molten glass.

Despite of the fact that the point just mentioned constitutes an urgent problem on carrying out the direct pressing method, Prior Arts 2 through 5 never mention the fact that the gobs are produced at conspicuously high speeds or the fact that a difficulty of matching in speed is present between the production of a gob and the press formation.

If the time required for the step of (3) and the time required for the step of (1) mentioned above were allowed to match with each other to a certain extent, it would become feasible to produce many glass optical elements within a very short time interval. The direct pressing method, therefore, is an industrial potential which promises the production of glass optical elements with high operational efficiency.

The step of (3) in the conventional method, however, is never finished at a fast pace determined at the step of (1).

The method of Prior Art 2 removes the furrowed surface which is called the "dendritic pattern" and which is formed on the shaped article of glass by heating the shaped article at high temperatures on the second hot working jig (lower die), which induces thermal deformation thereof. This removal of the furrowed surface, however, requires the shaped article to be retained for a long time at a temperature high enough for the glass to deformed under the weight of its own by virtue of surface tension. Since Prior Art 1 spends much time in the removal of the furrows as described above, therefore, it cannot shorten the duration of the step of (2) and cannot take advantage of the direct pressing method.

Further, since the temperature mentioned above is fairly higher than the standard press temperature. Prior Art 1 has the problem that the forming dies will not endure long service because the protracted contact thereof with the glass in process prominently aggravates the damage inflicted thereon.

The method of Prior Art 3, similarly to that of Prior Art 2, spends much time in the removal of furrows formed on the surface of the shaped article of glass and, therefore, confronts the problem that the duration of the step of (2) will not be shortened.

The method of Prior Art 4, similarly to that of Prior Art 2, never solves the problem of shortening the duration of the step of (2) because the furrows and the surface defects of glass occurring due to cuts are eliminated by the help of the surface tension thereof which is controlled by heating the glass on the receiving dish until the viscosity thereof falls below a level not more than $10^5$ poises.

In contrast, Prior Art 5 attains the reception of the separated mass of molten mass by causing the dropping mass to remain afloat with the gas spouted through the surface of a porous member. It is presumed that this gaseous suspension prevents the glass gob from forming a furrowed surface and permits the duration of the step of (2) to be shortened to a certain extent. The method of Prior Art 5, however, has the problem of spending much time at the step of (3).

Further, it is difficult to stably keep the glass gob afloat over the surface of the porous member contemplated by Prior Art 5. This induces another problem different from the problem of shortening the steps.

Specifically, the durations required for the steps (2) and (3) as shown in the working examples of the Prior Arts mentioned above are as follows.

In the working example of Prior Art 2, the durations or times required for the steps of (2) and (3) are 5 to 20 minutes and 1 to 2 minutes, respectively. In the working example of Prior Art 4, the time required for the step of (2) is 2 to 3 minutes and the time of the press forming at the step of (3) is 15 seconds, while the total time required is 2 to 3 minutes. Further, in the working example of Prior Art 5, the time required for the steps of (2) and (3) are about 2 minutes and about 2 minutes, respectively.

On the other hand, it is noted that the time required for the step of (1) (the time necessary for the production of one glass gob) is about 2 to 10 seconds, as mentioned above.

This fact, although not mentioned anywhere in Prior Arts 2 through 5, implies that, when the direct pressing method is implemented by the conventional technique, a fairly large number (15 to 40) of forming dies must be prepared for one glass gob forming machine or apparatus. This means that the production involved herein requires large facilities and incurs a high cost. Particularly, the forming dies are very expensive as compared with the jigs for temperature adjustment and the production cost becomes high in accordance with an increase of the forming dies to be required.

As described above, the press forming methods for a glass gob which are disclosed in Prior Arts 2 through 5 are not suitable for the direct pressing method. In order to manufacture the shaped article of glass with high precision, it is desirable that the step (3) can be shortened.

SUMMARY OF THE INVENTION

It is therefore an object of this invention to provide a method which can manufacture a glass optical element with high operational efficiency within a short time.

It is another object of this invention to provide a direct pressing method of the type described, wherein a forming step is capable of quickly producing a glass optical element by pressing a glass gob.

A method to which this invention is applicable is for use in the production of a glass optical element by press forming a glass gob manufactured from molten glass without cooling the glass gob to a room temperature. According to an aspect of this invention, the method comprises a first step of receiving a mass of molten glass dropped, with a gas stream spouted, to form the glass gob, a second step of keeping the glass gob afloat over a gas stream spouted so that the glass gob is adjusted to a temperature corresponding to a glass viscosity between $10^{5.5}$ and $10^9$ poises, and a third steep g of pressing the glass gob of adjusted temperature into a shaped article of glass with a pair of forming dies which is kept at a first temperature corresponding to a glass viscosity of the glass gob between $10^8$ and $10^{12}$ poises and which is lower than the temperature of the glass gob, to extract the shaped article as the glass optical element from the forming dies when the temperature of the forming dies is lowered to a second temperature corresponding to a glass viscosity between $10^{13.4}$ and $10^{14.5}$ poises.

According to another aspect of this invention, the method comprises the steps of dropping the molten glass flow towards a receiving die located under the molten glass, giving a wind blast on the molten glass flow to cut the molten glass flow into a sequence of glass gobs, and shaping each of the glass gobs into the glass optical element by pressing each glass gob on predetermined conditions.

DETAILED DESCRIPTION OF THE INVENTION

Figure 1:
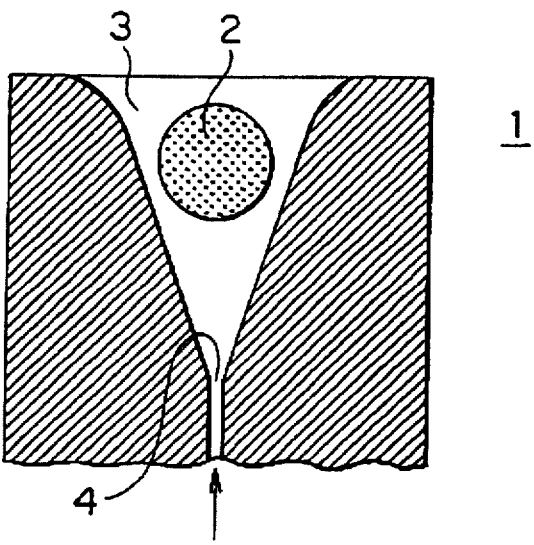
FIG. 1 is a schematic explanatory diagram of a floating device used in the present invention.

Briefly, this invention concerns a method of manufacturing a glass optical element by pressing a glass gob formed by molten glass before the glass gob is cooled to a room temperature. Specifically, the method comprises a first step of receiving a mass of molten glass, dropping or flowing down with a gaseous stream spouted from a lower portion to thereby form a glass gob and a second step of keeping the formed glass gob afloat over the gaseous stream. During the second step, the glass gob is adjusted to a temperature equivalent to a glass viscosity in the range between $10^{5.5}$ and $10^9$ poises. The method further comprises a third step of pressing the glass gob at the temperature with a pair of forming dies kept at a temperature which is equivalent to a glass viscosity of the glass gob in the range between $10^8$ and $10^{12}$ poises and which is lower than the temperature of the glass gob, then cooling the forming dies. During this step, the shaped article of glass is released from the forming dies after the temperature near the surface of the forming dies is lowered below the temperature equivalent to a glass viscosity of $10^{13.4}$ poises.

Now, this invention will be described in detail below.

The method of this invention comprises a step of obtaining a glass gob from molten glass (the first step), a step of adjusting the temperature (viscosity) of the glass gob to a temperature suitable for press forming (the second step), and a step of pressing the glass gob at the adjusted temperature (the third step). Thus, this method according to this invention is characterized by particularly performing the third step under the conditions mentioned above.

The press forming under the conditions mentioned above makes it possible to shorten the time required for press forming to the range between 40 and 100 seconds and to consequently manufacture a glass optical element with high operational efficiency.

First Step

The first step is for forming a glass mass from molten glass. More specifically, the molten glass is supplied continuously through an outlet pipe and individually shaped into a glass gob one by one. The glass gob may preferably be shaped into a sphere or a marble (namely, a flattened sphere).

The following three methods are preferably adopted for forming each glass gob.

(1) A first one of the methods attains glass gobs of a prescribed weight by allowing molten glass flowing down from an outlet pipe to be spontaneously separated under the weight of its own by virtue of the surface tension thereof before or during the reception thereof with a receiving die.

(2) A second one of the methods attains glass gobs of a prescribed weight by allowing molten glass flowing down from an outlet pipe to be forcibly cut by blowing a gas before or during the reception thereof with a receiving die.

(3) A third one of the methods attains glass gobs of a prescribed weight by receiving molten glass flowing down from an outlet pipe with a receiving die, then quickly descending the receiving die, and thereby cutting the molten glass into the gobs.

All of the methods (1) through (3) mentioned above are featured without by separating the molten glass flow without use of a shear. The methods (1) through (3) have an advantage that the produced glass gobs do not incur such defects of separation such as inclusion of seeds and folds which would occur by the use of the shear.

The temperature of the molten glass is properly decided in relation to the viscosity of the molten glass flowing down through the outlet pipe. Preferably, the viscosity of the downward flow of the molten glass falls within the range between 5 and 50 poises in due consideration of the diameter of the outlet pipe, the stability of glass, and the surface tension, ropiness, etc. of the glass. The temperature at which the glass has the viscosity in the range mentioned above generally falls within the range between 800° and 1100° C., although it is variable at each glass.

The unit weight of each glass gob can be properly decided, depending on the unit size of the glass optical elements to be obtained as finished products.

The molten glass masses which have been formed by the method described above and which are in the process of dropping or flowing down are received by the stream of a gas spouting from a lower portion. The glass gobs received by the gaseous stream are retained afloat. For the reception and floatation of the glass gobs, the receiving die disclosed in JP-A-02-14839, for example, can be used.

This receiving die is provided with a depressed portion for receiving and keeping the glass gob afloat. The depressed portion has one or more orifices to blow a gas and to thereby keep the glass gob afloat.

Further in this invention, the forming die unit is not always restricted to the forming die unit disclosed in JP-A-02-14839 but may have an improved construction. Specifically, the improved receiving die forms below the glass gob in an opening part a closed empty space which is enclosed with the glass gob and the opening part. Inside this empty space, the glass gob can be kept afloat in the opening part with the stream of a gas spouted through the orifice from a lower portion. The glass gob favorably floats by constructing the closed empty space as described above.

If the gaseous stream is locally irregularly concentrated at the lower central part of the glass gob, the glass gob will be undesirably deformed at the lower central part thereof when the glass is put into a low viscosity at the second step for the temperature adjustment. In order to avoid occurrence of such deformation, the gaseous stream may be spouted through a plurality of orifices to suppress the local concentration of the gaseous stream at the lower central part of the glass gob. With this structure, the glass gob can be caused to flow over the receiving die without deformation of the glass gob. At any rate, the glass gob is retained in an untouched state in the depressed part of the receiving die by virtue of the gaseous stream spouted through the orifices.

Figure 2A:
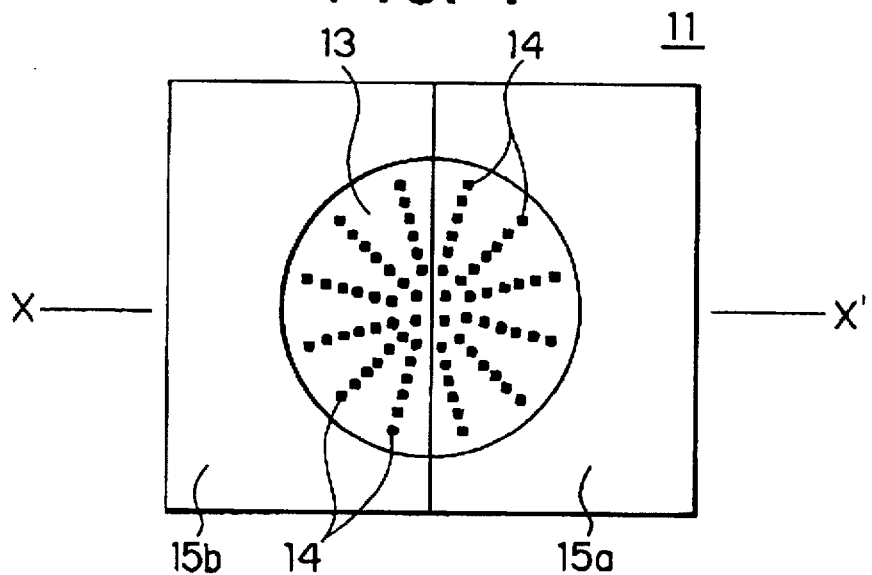
FIGS. 2A and 2B are a plan view and a sectional view of a floating device used in the present invention, respectively.
Figure 2B:
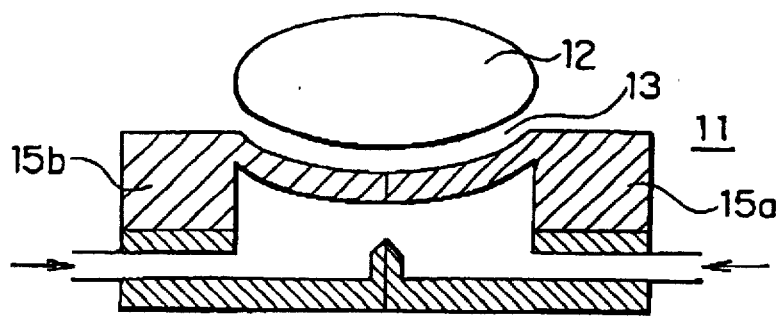

An example of the receiving die is illustrated in FIGS. 1, 2A, and 2B.

In FIG. 1, a receiving die (floating device) 1 is illustrated and is provided with an opening portion 3 and a gas passage 4 so as to keep a glass gob 2 afloat. Practically, the glass gob 2 is kept afloat in the opening portion 3.

FIG. 2A shows a plan view of a receiving die (floating device) 11 while FIG. 2B shows a cross section taken along the line X–X' in FIG. 2A. For brevity of description, a glass gob 12 is omitted from FIG. 2A. The receiving die (floating device) 11 illustrated in FIGS. 2A and 2B comprises laterally separable split dies 15a and 15b and the opening portion 13 to define the opening portion 13 therein. A plurality of passages 14 are formed through the split dies 15a and 15b and directed to the opening portion. 13 to guide a gas into the opening portion 13 and are equal in number to 76 in the illustrated example. By the gas spouted through the plurality of passages 14, the glass gob 12 is favorably kept afloat.

The glass gob can be kept afloat in a rotating state by imparting directivity to the gaseous stream.

The glass gob can be shaped into a desired configuration by controlling the direction of rotation and the number of revolutions of the glass gob while the glass gob is softened. Actually, a degree of roundness is improved by rotating the glass gob in the horizontal direction and a degree of sphericity is improved by rotating it in the vertical direction.

The gas to be used to keep the glass gob afloat may be selected so that the receiving die and a forming die unit are not eroded. Such a gas may be a retardant gas and/or a nonoxidizing gas and may be, for example, a nitrogen gas. In addition, a small amount of a reducing component, such as a hydrogen gas, may be added to the nitrogen gas and so on. Instead, air may be used when the floating and softening apparatus is made of an oxide or a substance which can form an oxide film.

The flow rate of the gaseous stream can be properly varied in due consideration of the configurations of the orifices, and the shape and the weight of the glass gob and the like. Usually, the flow rate falls within the range between 0.005 and 20 liters/minute so as to make the glass gob float. If the flow rate of gas is less than 0.005 liter/minute, the glass gob has failed to completely float when the weight of the glass gob exceeds 300 mg. Conversely, if the flow rate of gas exceeds 20 liters/minute, the glass gob on the floating and softening apparatus has greatly fluctuated and has been undesirably deformed on heating even when the weight of the glass gob is more than 2000 mg.

The material of the floating apparatus is not restricted if the material exhibits heat resistance such that any adverse effect occurs on the glass gob when the floating device happens to contact the glass gob during the floating process. Such materials may be, for example, silicon, silicon carbide, silicon nitride, tungsten carbide, aluminum oxide, titanium nitride, titanium carbide, zirconium oxide, various kinds of cermet, carbon, stainless steel, quartz glass, glass, and various kinds of heat-resistant metals.

In the conventional method, when the glass gob has low viscosity such that it deforms under the weight of its own, it is extremely difficult to preclude fusion between the glass gob and the holding apparatus during the heat treatment.

Taking the above into consideration, the present invention keeps the glass gob afloat by the use of the gas spouted from the inner part of the floating apparatus and forms a gas layer between the surface of the glass gob and the inner part of the floating apparatus. As a result, it is possible to manufacture the glass gob from molten glass without the occurrence of reaction between the floating apparatus and the glass gob. Further, the glass gob can be stably caused to float over the floating apparatus by rotating the glass gob. The glass gob can be thermally softened with the shape thereof kept intact and can be intentionally deformed to a required shape, if necessary.

Even when the glass gob has surface defects such as furrows and the like, the surface defects can be eliminated by causing the glass gob to float by the gaseous stream and by controlling the shape of the glass gob in the above mentioned manner. When the glass gob has seeds or a shear mark which is a streak of fold or striae, this defects cannot be, however, eliminated even by softening the glass gob at a fairly high temperature.

Second Step

The second step is for controlling a temperature which corresponds to a glass viscosity between $10^{5.5}$ poises and $10^9$ poises with keeping the glass gob afloat by spouting the gaseous stream from an underside of the glass gob.

Herein, it is to be noted that the molten glass at a temperature near to 1000° C. is converted into the glass gob and suddenly cooled or quenched during the first step. As a result, a temperature distribution is widely varied between the surface of the glass gob and the core or center thereof during the first step. The second step, therefore, eliminates the temperature distribution mentioned above and, at the same time, adjusts the temperature of the glass gob at a temperature corresponding to the glass viscosity of the range between $10^{5.5}$ and $10^9$ poises. Consequently, the second step facilitates the next step of pressing which forms a glass optical element.

If the glass viscosity becomes less than $10^{5.5}$ poises in spite of the temperature adjustment, a satisfactory surface precision has not been obtained at the next pressing step. If the glass viscosity exceeds 109 poises as a result of the temperature adjustment, the glass gob has not been expanded or spread into a prescribed thickness unless the forming die unit is heated to a high temperature during the press forming. Consequently, a long time is required to cool the forming die unit, which makes the cycle of the forming process very long.

From the viewpoint of accomplishing high surface precision at the pressing step and shortening the pressing process or step, the glass viscosity preferably falls within a range between $10^6$ and $10^8$ poises.

The second step can be carried out continuously after the first step by using the receiving die used in the first step. Alternatively, the second step may be carried out by the use of a receiving die which is different from that used in the first step and to which the glass gob is transferred from the receiving die of the first step.

The glass gob may be transferred from the receiving die (will be called a first die) of the first step to the receiving die (will be called a second die) of the second step in a following manner. Specifically, the first die is formed by a split type die composed of at least two separate segments and horizontally opened and drops the glass gob downwards by opening the separate segments. The glass gob dropped from the first die is received by the second die located below the first die. This transfer operation say be referred to as a dropping method.

In this event, the split die has preferably gas conduits individually coupled to the separate segments to guide the gas causing the glass gob to float over the split die. The dropping method can avoid deformation of the glass gob and a temperature variation of the glass gob, which might occur during the transfer operation from the first die to the second die when a suction pad or the like is used.

In addition, a guide member may be used in the dropping method so as to drop or guide the glass gob from the first die to a center portion of the second die without any eccentricity.

The glass gob which has undergone temperature adjustment at the second step is subsequently transferred to the forming die unit. This transfer of the glass gob of adjusted temperature is appropriately implemented by the use of a split type die which is horizontally opened and which consists of at least two separate segments as the receiving die used in the second step. With this structure, it is possible to transfer the glass gob temperature-adjusted to a pressing die used in the third step by horizontally opening the split die used in the second step and by consequently dropping the glass gob onto a lower die of the pressing die. Appropriately, the split die may have gas conduits for the gas like in the above. This dropping method can also serve to avoid deformation and temperature change of the glass gob, as mentioned above.

Third Step

The third step receives the glass gob of the glass viscosity adjusted to the range between $10^{5.5}$ and $10^9$ poises at the second step and presses the received glass gob by the use of a pair of forming dies kept at a temperature which corresponds to a glass viscosity between $10^8$ and $10^{12}$ poises and which is lower than the temperature of the glass gob. During the third step, the forming dies are cooled and released to take out the shaped article of glass from the forming dies after the temperature near the surfaces of the forming dies are lower than a temperature corresponding to the glass viscosity of $10^{13.4}$ poises. This press forming, when performed by an unequal temperature pressing method, is effective to quickly obtain a glass optical element of high surface precision. In the unequal temperature pressing method, it is to be noted that the glass gob is kept at a temperature higher than that of the forming dies at the beginning of the pressing step.

At the beginning of the third step, the temperature of the glass gob is adjusted to the temperature which corresponds to the glass viscosity between $10^{5.5}$ and $10^9$ poises mentioned above, preferably, between $10^6$ and $10^8$ poises. The forming dies are adjusted to a temperature which corresponds to the glass viscosity between $10^8$ and $10^{12}$ poises, preferably, between $10^9$ and $10^{12}$ poises in the vicinity of the forming surfaces of the forming dies.

Properly, the initial pressing is carried out under pressure in the range between 10 and 300 kg/cm$^2$ (preferably, between 20 and 200 kg/cm$^2$) for a period in the range between 1 and 60 seconds (preferably between 2 and 30 seconds) under the heating conditions mentioned above. The shaped glass article consequently obtained is cooled at a rate of not less than 20° C./minute and not more than 200° C./minute with a pressure imposed onto the glass gob. The pressure may be the same pressure as that of the initial pressing, or be lower than the latter. Alternatively, the pressure may be only the weight of the upper die imposed onto the glass gob. At any rate, the pressing operation is continued until the temperature is lowered to a temperature equivalent to the glass viscosity of $10^{13.4}$ poises, and the cooled shaped article is released from the forming dies. The cooling may be started at the same time as the beginning of the initial pressing.

The released shaped article of glass is simply annealed at a place different from the forming apparatus or precisely annealed with a different apparatus. By selecting the pressing conditions as described above, the glass optical element is obtained with ideal surface precision at a very high forming speed and, at the same time, the forming dies can have a very long life because the temperatures of the forming dies are kept at a low temperature as compared with the equal temperature pressing method wherein the glass gob is kept at the same temperature as the temperatures of the forming dies at the beginning of the pressing step.

At the third step (pressing step), the known forming dies for high precision forming can be used. Specifically, the forming dies may be composed of hard metal, cermet, silicon carbide, or silicon nitride as the material for the matrix thereof and a carbon-based film (inclusive of a film containing a C—H bond) and a thin film of varying carbide, nitride, or platinum alloy as the material for the surface thereof. Alternatively, $Cr_2O_3$ containing a small amount of $TiO_2$ and/or $ZrO_2$ may be used as the material of the forming dies.

In the method of this invention, the times required for each of the first through the third steps are as follows, though they are variable with relevant operating conditions.

First step: 2 to 10 seconds

Second step: 30 to 80 seconds

Third step: 40 to 80 seconds

In the method of production according to this invention, each of the second and the third step may be carried out by the use of two or more lines of machines in parallel to one another for a single line of a machine used in the first stop which produces glass gobs at intervals of 2 to 10 seconds. To be specific, by preparing a plurality of the first receiving dies, the second receiving dies, and the forming dies for a single outlet pipe, the glass optical elements can be continuously produced in concert with the speed of formation of the glass gobs.

When the time required for the first step is set at 10 seconds and the time required for the second step and that for the third step are each set at 40 seconds, for example, the continuous production by the direct pressing method can be realized by preparing four sets of the first receiving dies, the second receiving, dies, and the forming dies.

The time of the first step may not be matched with the times required for the second and the third step. In other words, the glass gobs formed at the first step may not be partially pressed and but used for the production of preforms (preformed articles) used for the precision press formation of glass optical elements manufactured by the use of the conventional reheat press. Specifically, when the time required for the first step is set at 10 seconds and the time required for the second step and that for the third step are each set at 40 seconds and each of the second and the third step is composed of two lines, one of two glass gobs may be forwarded to the two lines for each of the second and the third step while the remainder may be used for the production of preforms.

Although the first through third steps are preferably carried out invariably in a non-oxidizing atmosphere, the first step may be carried out in the open air while the second and the third step may be carried out in a non-oxidizing atmosphere. In this case, it is possible to dispose intermediate retainers at the inlet and the outlet of the machine or apparatus kept at the non-oxidizing atmosphere and to transfer the glass gob via the intermediate retainers to the second receiving die which is located inside the apparatus kept under the non-oxidizing atmosphere. It is further possible to carry out the first step in the open air and then directly transfer the glass gob to the receiving die of the second step located inside the apparatus kept under the non-oxidizing atmosphere.

Now, this invention will be described more specifically below with reference to practical examples.

EXAMPLE 1

A pressing apparatus or device used in the present example is illustrated schematically in FIGS. 3 through 6.

Figure 3:
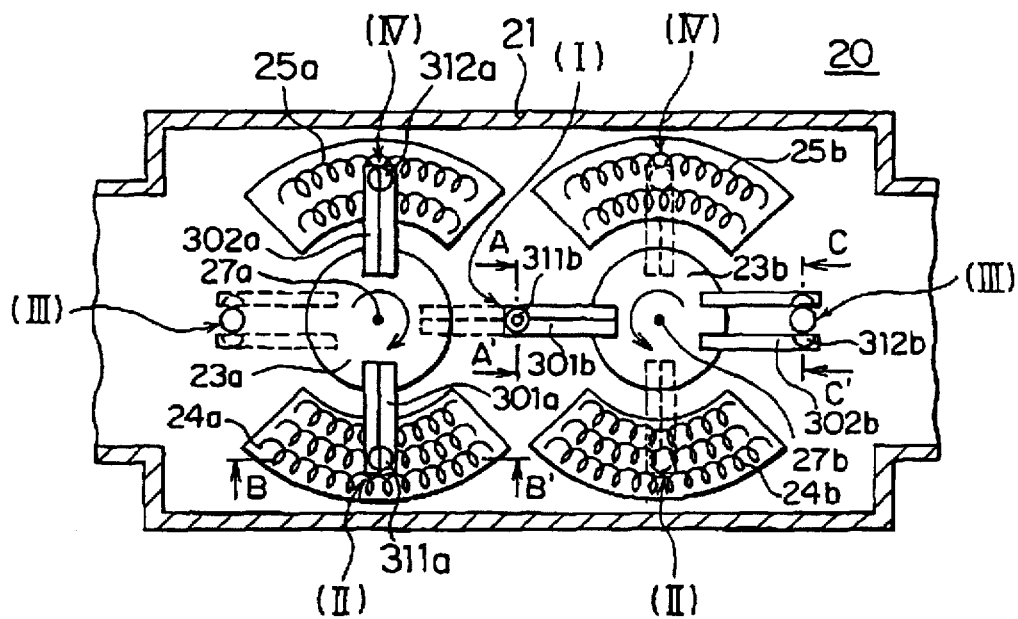
FIG. 3 is a schematic explanatory diagram of a forming device used in Example 1.
Figure 4:
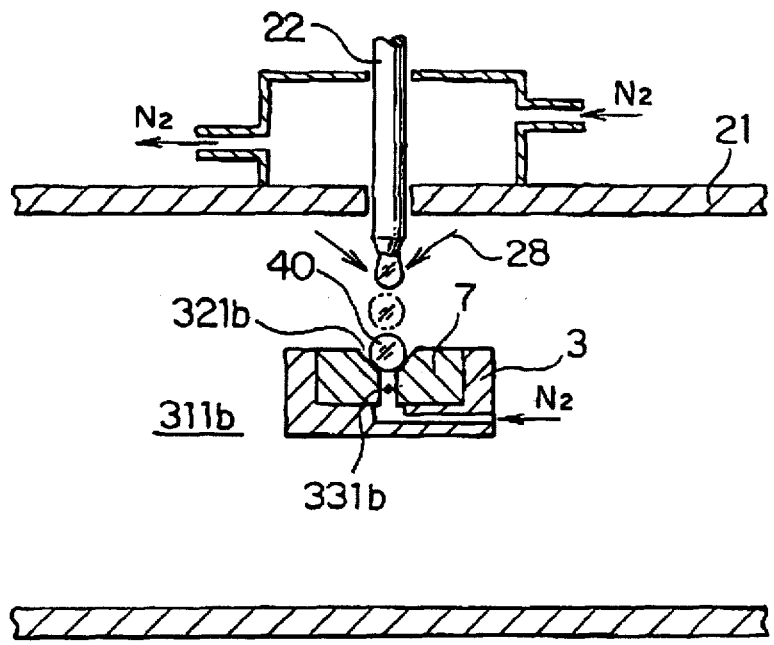
FIG. 4 is a cross section taken through the forming device shown in FIG. 3 along the line A–A'.
Figure 5:
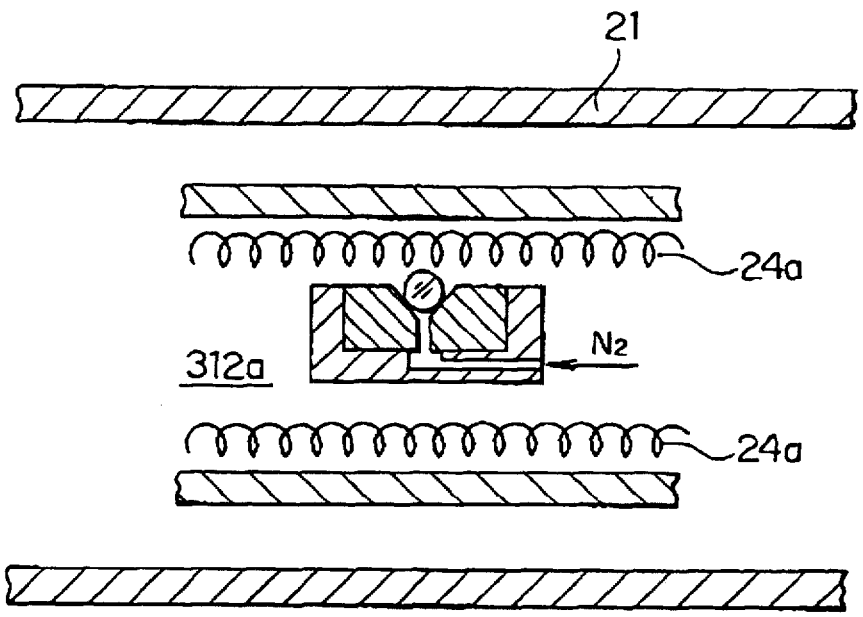
FIG. 5 is a cross section taken through the forming device shown in FIG. 3 along the line B–B'.

FIG. 3 is a plan view of the interior of a pressing device 20. FIG. 4 is a cross section taken through FIG. 3 along the line A–A'. FIG. 5 is a cross section along the line B–B', and FIG. 6 a cross section along the line C–C'.

The pressing device 20 shown in FIG. 3 has a chamber 21 kept in a tightly closed state, a molten glass outlet pipe or conduit 22 (not shown in FIG. 3), turntables 23a and 23b, temperature adjusting heaters 24a and 24b (providing that 24a and 24b denote a vertical pair of heaters, 24a standing for the lower heater and 24b for the upper heater), preliminary heaters 25a and 25b (providing that 25a and 25b denote a vertical pair of heaters, 25a standing for the lower heater and 25b for the upper heater), and forming dies 50a and 50b (not shown in FIG. 3). The chamber 21 is kept in a non-oxidizing atmosphere (such as, for example, an atmosphere of nitrogen gas) therein.

The turntable 23a rotates clockwise round a center 27a of rotation and the turntable 23b rotates counterclockwise round a center 27b of rotation.

The turntable 23a is provided with two arms 301a and 302a which are possessed of mechanisms movable along a horizontal direction to be opened and closed and which are spaced apart from each other by 180° round the center 27a of rotation. These arms are each provided at the leading end thereof with receiving dies (apparatuses for floating glass gobs) 311a and 312a which are each separated into two segments.

Likewise, the turntable 23b is provided with two arms 301b and 302b which are possessed of mechanisms movable along the horizontal direction and which are spaced apart from each other by 180° round the center 27b of rotation. These arms are each provided at the leading end thereof with receiving dies (apparatuses for floating glass gobs) 311b and 312b which are each separated into two segments.

At the place (I) of FIG. 3 (hereinafter referred to as "glass gob forming zone"), is disposed the molten glass outlet pipe 22 which is depicted in a cross section in FIG. 4. The first step is carried out by the use of the outlet pipe 22. The molten glass output pipe 22 is made of platinum or a platinum alloy and is coupled to a glass melting furnace (not shown). The illustrated outlet pipe 22 has an inner diameter of 1.2 mm and an outer diameter of 2.5 mm.

The receiving die 311b illustrated in FIG. 4 is made of stainless steel plated with chromium and has a depressed part 321b of a flared shape. An inner surface of the receiving die 311b is mirror-finished. At the center of the receiving die 311b, a small orifice 331b is opened to spout a nitrogen gas at a rate of 0.5 liter/min from a lower portion. The receiving die 311b is surrounded by a heater (not shown) and is kept thereby at 500° C. during the first step.

At the place of (II) of FIG. 3 (hereinafter referred to as "temperature adjusting zone"), is arranged the temperature adjusting heater 24a which is depicted in a cross section in FIG. 5. The second step is carried out by the use of the temperature adjusting heater 24a.

Figure 6:
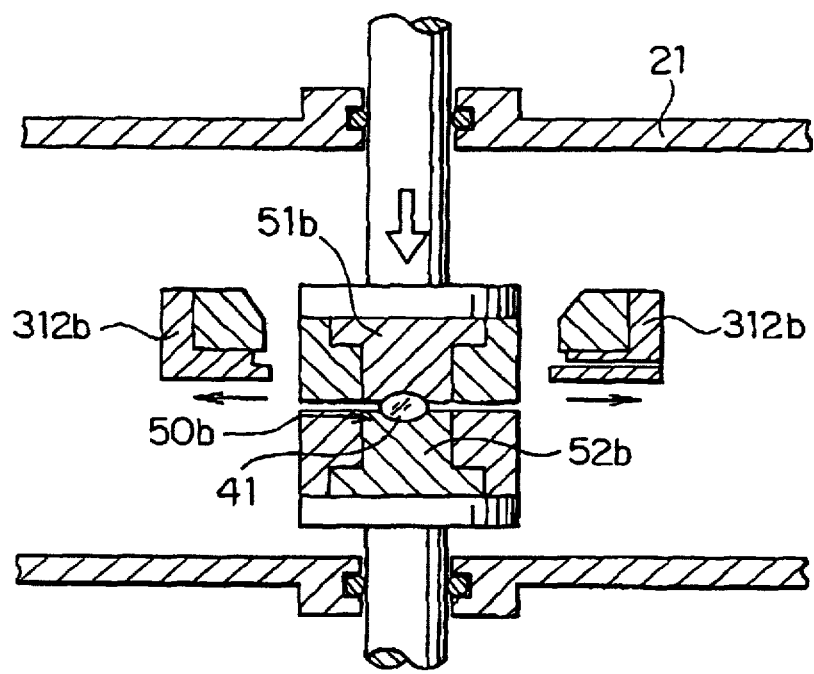
FIG. 6 is a cross section taken through the forming device shown in FIG. 3 along the line C–C'.

At the place (III) of FIG. 3 (hereinafter referred to as "shaping zone"), are arranged the shaping dies 50b which are depicted in a cross section in FIG. 6. The third step is performed by using the shaping dies 50b.

At the place (IV) of FIG. 3 (hereinafter referred to as "preheating zone"), are arranged the preliminary heaters 25a which are operated to preliminarily heat the receiving die to be used at the first step and which are opposed to each other upwards and downwards. The receiving die is heated by the preliminary heaters 25a prior to the first step after completion of the third step.

Now, description will be made about forming barium borosilicate glass which has a transformation point of 534° C. and a sag point of 576° C. In the following description, no discrimination will be made between the left side (indicated by a suffix "a" of the relevant reference numeral) and the right side (indicated by a suffix "b" of the relevant reference numeral).

First Step

The first step is carried out in the glass gob forming zone [place (1)].

As illustrated in FIG. 4 (the suffix "b" omitted from the description), the nitrogen gas of a high pressure is spouted through three circumferentially spaced nozzles adjacent to the leading end of the outlet pipe 22 and is instantaneously blown from three directions, as shown by the arrowheads 28, against molten glass of a glass viscosity of about 15 poises flowing down from the leading part (about 1000° C.) of the outlet pipe 22. As a result, the stream of molten glass is cut by the wind blast of the nitrogen gas. A mass of molten glass cut by the wind blast is dropped into the receiving die 311 which is attached to the leading end of the arm 301. Within the receiving die 311, the nitrogen gas is spouted up at a rate of 0.5 liter/minute. By selecting a timing of wind blast of the high pressure, glass gobs 40 of 0.4 g in weight could be stably dropped. Each glass gob 40 is floated inside the receiving die 311 and rotated therein to be rendered into an accurately spherical shape.

Second Step

The second step is performed in the temperature adjusting zone [place (II)] in FIG. 3.

In the second step, the turntable 23 is rotated by 90° with the glass gob 40 kept afloat in the receiving die 311 and is moved to the temperature adjusting zone. In this event, the surface of the glass gob 40 is quickly cooled with an inner area of the glass gob 40 kept at a high temperature. As a result, a temperature distribution takes place in the glass gob 40. Under the circumstances, the glass gob 40 is heated by the heater 24 shown in FIG. 5 (the suffix "a" of the relevant reference numerals omitted from the description) and is kept at the glass viscosity of $10^6$ poises (699° C.).

Third Step

The third step is performed in the forming zone [place (III)].

The turntable 23 is again rotated by 90° with the glass gob 40 kept afloat in the receiving die 311 and moves the receiving die 311 to the forming zone. As shown in FIG. 6 (the suffix "b" of the relevant reference numerals omitted from the description), the forming die unit 50 consists of an upper die 51 and a lower die 52. The upper die 51 and the lower die 52 are both made of silicon carbide and have forming surfaces thereof coated with hard carbon films. The forming die unit 50 is kept at 572° C. which corresponds to a glass viscosity of $10^{11}$ poises.

Immediately after the rotation of the turntable 23, the receiving die 312 is divided or opened by the open and close mechanism of the arms with the glass gob 40 kept afloat on the receiving die 312. Thus, the glass gob 40 is dropped onto the lower die 52 by opening the receiving die 312. The receiving die 312 is then retracted at once. Further, the upper die is immediately lowered and the pressure of 150 kg/cm² is imposed on the glass gob for 5 seconds. Then, the pressure is reduced to 30 kg/cm². Subsequently, the glass gob is forcibly cooled by a cooling gas for 20 seconds. Such cooling is continued until the glass gob 40 is cooled to the temperature corresponding to the glass transformation point of 534° C. Then, the cooled glass gob is released from the forming die unit.

A shaped article of glass (for example, lens) 41 consequently formed is taken by a suction pad (not shown) out of the forming die unit through a simple cooling zone (not shown) which is provided on the left or the right side of the forming die unit and which serves to gradually cool the shaped article.

The forming die unit 50, after the release of the shaped article, is immediately heated to the temperature of 572° C. again in preparation for the following press forming step.

Meanwhile, the receiving die 312 is put into the closed state and is rotated by 90° C. to be moved to the preheating zone [place (IV)]. In the preheating zone, the receiving die 312 is adjusted to 500° C.

The arms are held in the glass gob forming zone, the temperature adjusting zone, the forming zone, and the preheating zone for retention times of 10, 30, 10, and 30 seconds, respectively. The forming step performed in a pair of the forming die units lasts for 40 seconds. As a result, shaped articles (lens) are obtained at the pace of one piece per 40 seconds in each of the left and the right set of the forming die units.

The left and the right arms are operated so as to move the receiving die units alternately at intervals of 20 seconds to a position directly below the outlet pipe 22. While the cut masses of molten metal are dropped from the outlet pipe 22 at intervals of 10 seconds, the lenses are manufactured as the shaped articles from the let and the right forming die units in the present apparatus at a rate of one piece per 20 seconds. In this operation, since the receiving die is remote from the position directly below the outlet pipe for 10 seconds in each period of 20 seconds, the present apparatus practically includes a mechanism which is adapted to discard one out of two glass gobs dropped within each period of 20 seconds, although not shown in the figures.

In the present example, the left and the right forming die units manufacture lenses which differ in weight from each other. Specifically, the right forming die unit produces double-convex lenses of 7 mm in diameter at a rate of one piece per 40 seconds. The lenses thus produced excels in appearance and quality as proved by the test results of within three lines of Newton rings and ½ line of ASU.

The left forming die unit continuously produces double-convex lenses of 0.3 g in weight and 6 mm in diameter at a rate of one piece per 40 seconds.

In this example, the stream of molten glass is cut by the wind blast for the purpose of forming lenses different in weight on the left and the right sides. If the lenses of the same weights are to be manufactured, the stream of molten glass might be cut by the use of a self-weight of each glass gob and surface tension thereof.

EXAMPLE 2

Figure 7:
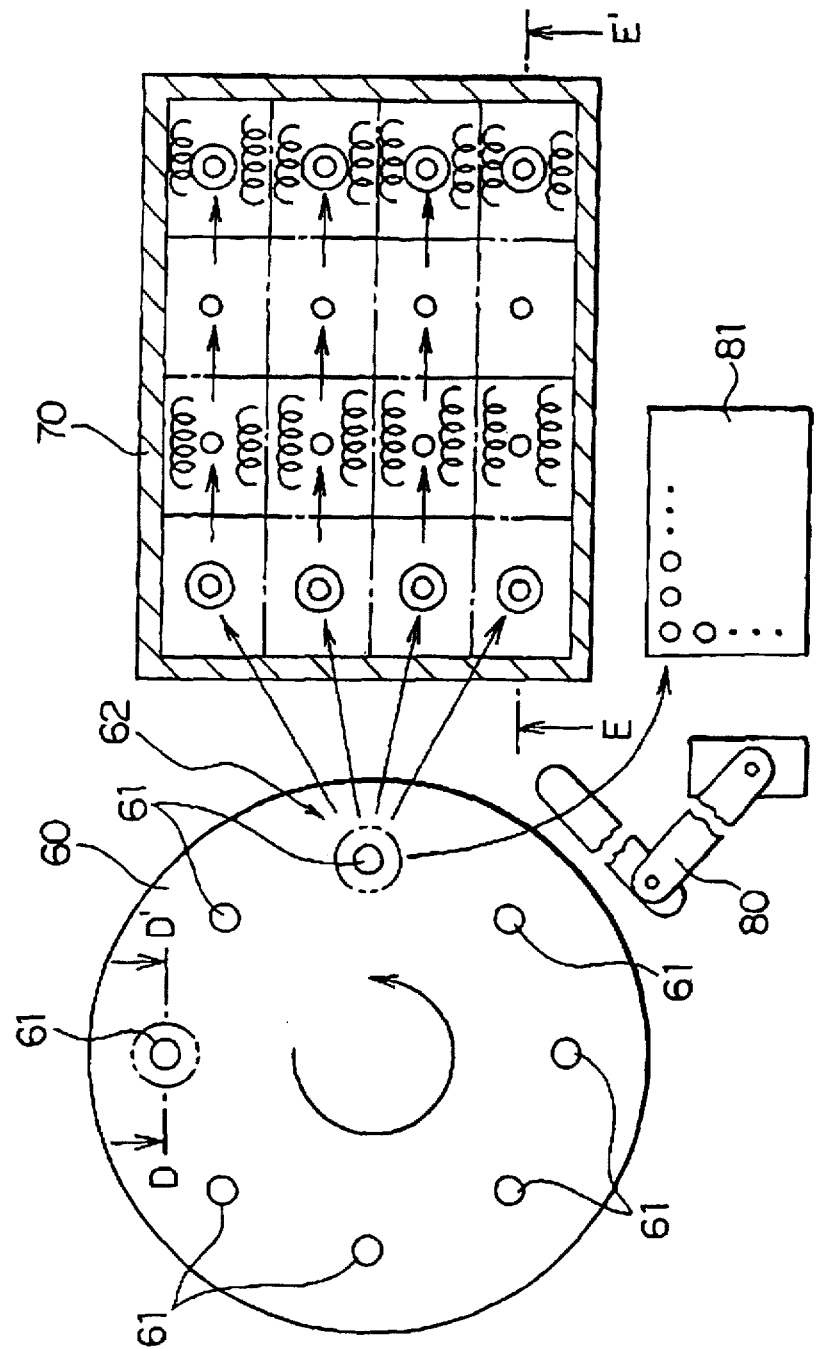
FIG. 7 is a schematic explanatory diagram of a foaming device used In Example 2.
Figure 8:
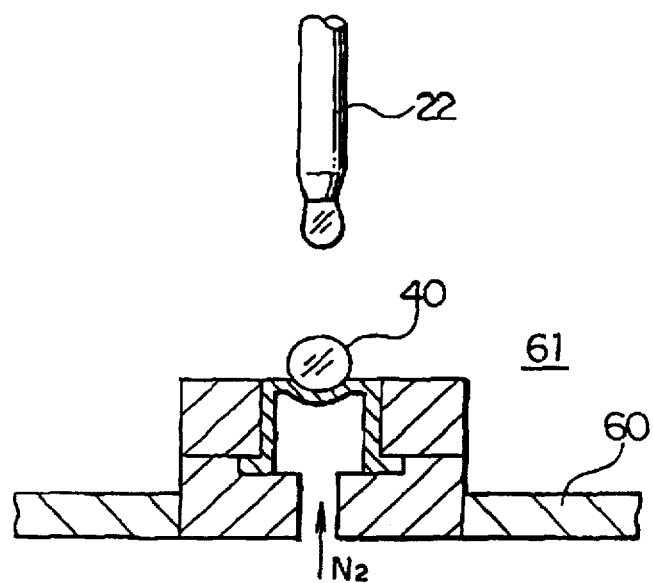
FIG. 8 is a cross section taken through the forming device shown in FIG. 7 along the line D–D'.
Figure 9:
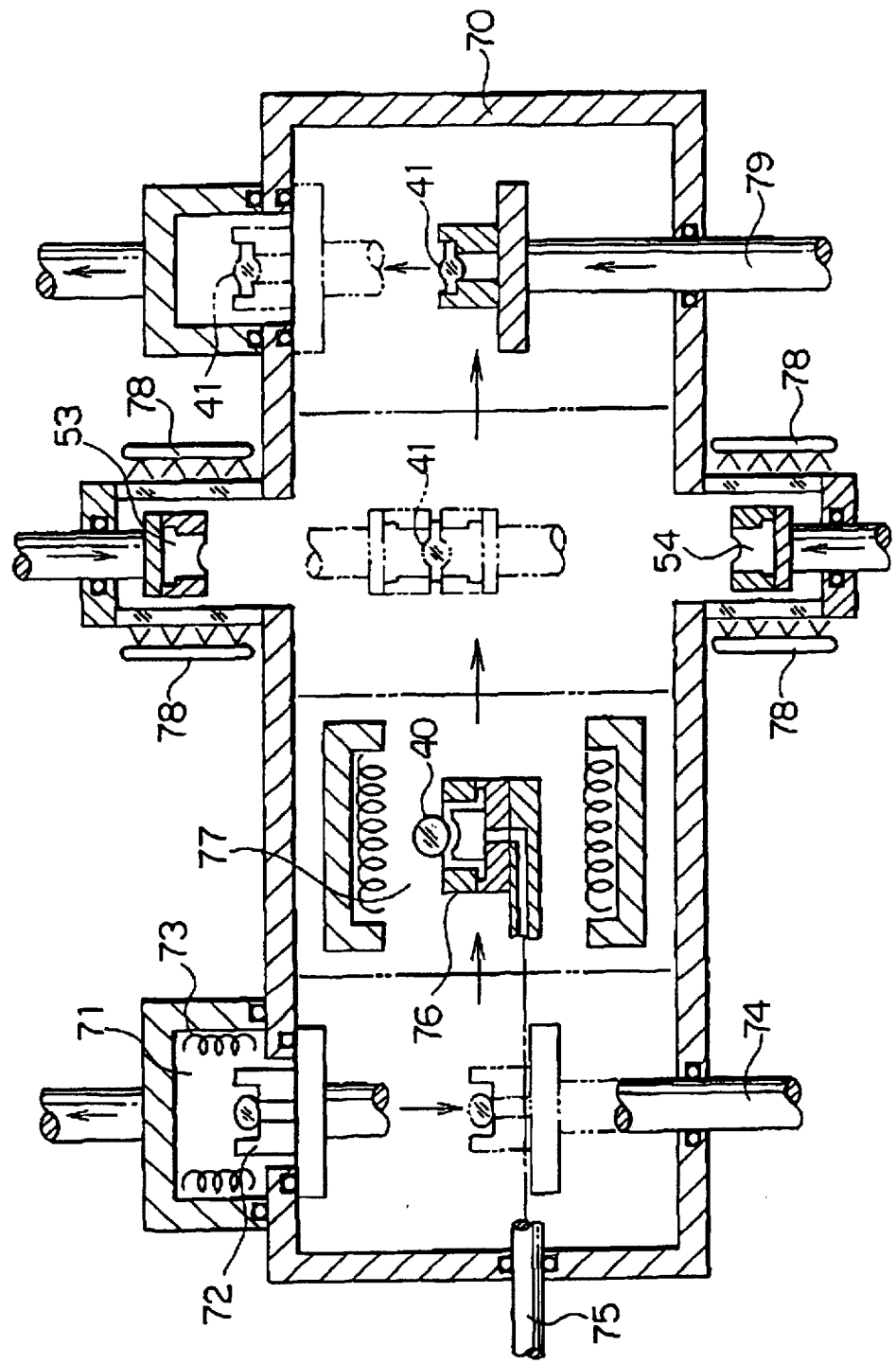
FIG. 9 is a cross section taken through the forming device shown in FIG. 7 along the line E–E'.

A pressing apparatus used in the example 2 is illustrated in FIGS. 7 through 9.

As illustrated in FIG. 7, the pressing device comprises a turntable 60 which serves as a part of a mechanism for forming glass gobs and a chamber 70 which accommodates a pressing mechanism. The turntable 60 is mechanically separated from the chamber 70 in this example.

FIG. 8 is a cross section taken along the line D–D' of FIG. 7 while FIG. 9 is a cross section taken along the line E–E' of FIG. 7.

First Step

In the mechanism for forming glass gobs shown in FIG. 7, the turntable 60 of a rotary type is provided with first receiving dies (as shown in FIGS. 2A and 2B) 61 which are each made of chromium-plated stainless steel and mirror-finished on an inner surface. The first receiving dies 61 are equal in number to eight in the illustrated example. Each of the first receiving dies 61 has small holes (FIG. 2A) which are equal in number to seventy-six (76) and each of which is 0.3 mm in diameter. Air is spouted from each small hole at a rate of 0.5 liter/min through the small holes of the first receiving dies.

In order to cut the molten glass flowing down from the molten glass output pipe 22, the first receiving dies are rapidly descended downwards, which may be referred to as a rapid descending method. According to the rapid descending method, glass gobs of 1.2 g and 1.5 g in weight are alternately obtained at an average interval of 7.5 seconds. The glass gobs are continuously manufactured with the turntable 60 rotated stepwise. At any rate, when the glass gobs 40 reach to a takeout position 62, at least the surfaces of the glass gobs 40 are solidified. The average viscosity of each glass gob is not less than $10^{11}$ poises, namely, exceeds $10^{11}$ poises.

Second Step

The chamber 70 which houses the pressing device therein is kept at a slightly positive pressure in a non-oxidizing atmosphere and contains therein four identical mechanisms arranged in parallel with one another. The chamber 70 includes an arrangement as shown in FIG. 9.

An inlet portion 71 acts as a chamber for replacing air with the nitrogen gas and is furnished with a relay jig 72 (made of a ceramic substance). By a takeout robot 80 (FIG. 7) provided at the leading end part thereof with a suction pad of a ceramic substance, glass gobs of 1.2 g in weight are sequentially transferred to the relay jigs 72 disposed for the respective four inlet ports 71. Meanwhile, the glass gobs of 1.5 g in weight are arranged on a pallet 81 shown in FIG. 7. The glass gobs of 1.5 g in weight have marble shapes without any defects and can be used as preforms for precision press forming glass optical elements by the use of the conventional reheat press.

When the glass gobs of 1.2 g in weight are set in place on the relay jig 72 of the inlet 71, the replacement between the air and the nitrogen gas is effected immediately. In this case, the inlet portions 71 are furnished with a heater 73 for preventing the glass gob from being cooled in the inlet portions 71.

Next, a support base 74 is lowered and each glass gob is transferred by a ceramic suction pad (not shown) to a second receiving die 76 which is attached to the leading end of an arm 75 and which is composed of split dies. The second receiving die 76 can be split into two parts and is provided with two nitrogen gas inlet conduits.

A heating zone 77 is set at a higher temperature than that in Example 1 and adapted to quickly heat the glass gob to a temperature (639° C.) corresponding to a glass viscosity of $10^8$ poises.

Third Step

An upper die 53 and a lower die 54 are each made of tungsten carbide and have the forming surfaces coated with a Pt—Rh—Au—Ir alloy film. The upper die 53 and the lower die are each kept by an infrared heater 78 at a temperature of 602° C. corresponding to a glass viscosity of $10^{9.5}$ poises.

The temperature-adjusted glass gob 40 on the second receiving die is pressed by the upper die 53 and the lower die 54. Specifically, it is subjected to initial pressing under pressure of 80 kg/cm² for 10 seconds and subsequently the pressure is decreased to 20 kg/cm². Simultaneously with the start of pressing, the glass gob is forcibly cooled by the ambient gas for 42 seconds to the glass transformation point of 534° C. Thereafter, the shaped or pressed article of glass is released from the forming die unit.

The shaped article 41 released from the forming die unit is transferred by a suction pad (not shown) to a simple annealing chamber, then elevated upwards of FIG. 9 by a support base 79, and taken out through an exit.

Immediately after dropping the glass gob 40 onto the forming surface of the lower die 54, the second receiving die 76 is retracted to the previous position and receives the next glass gob thereon.

The temperature of the forming die unit is returned to 602° C. at the same time that the shaped article of glass is released from the forming die unit. In this manner, double-convex lenses with high precision are obtained flawlessly at a rate of one piece per 60 seconds from each press zone. The lenses have outer diameters of 13 mm without any flaws.

As a whole, the pressing device can manufacture the shaped articles of glass at a rate of one piece per 15 seconds. In addition, preforms of 1.5 g in weight to be reheated and pressed by a separate pressing apparatus are arranged on the pallet 81 (FIG. 7) at a rate of one piece per 15 seconds.

EXAMPLES 3 TO 12

Shaped articles of glass are continuously manufactured by the use of the apparatus described in Example 2 under a wide variety of conditions indicated in Table 1. In Table 1, surface precision and surface states of the shaped articles are also shown together with the forming conditions.

Herein, it is noted that the shaped articles were tested for measuring the surface precision and rated on the two-point scale, wherein the symbol ◉ stands for not more than 0.5 line of striae and the symbol ○ for one or more lines of striae. All the samples used in the test invariably showed satisfactory states of surface (◉).

pressing method which incorporates therein a forming step capable of obtaining glass optical elements by quickly pressing glass gobs.

This invention has realized production of glass optical elements of high precision by directly pressing molten glass at an extremely high speed. Particularly, in a preferred embodiment of this invention, a stream of molten glass flowing down from an outlet pipe is cut into glass gobs without any shear. This is very effective to avoid defects resulting from using a shear. In addition, the glass gob are received by the receiving die adapted to spout a gas through the small holes thereby and are therefore kept afloat without contacting the receiving die. This makes it possible to avoid occurrence of furrows, striae, protuberances, or dirt resulting from contact with the receiving die. In addition, adhesion of volatile matter from glass can be also avoided. Each glass gob has a free surface on a whole and is pressed with precision press forming die unit which is kept at a temperature lower than that of the glass gobs. Thus, perfect appearance and high quality of the lenses have been manufactured. Practically, the lenses had three lines of Newton rings and 0.5 line of ASU and were obtained at an extremely high speed.

Further, this invention provides an epochal method which can manufacture lenses which differ from one another in weight or shape in parallel and which simultaneously enables production of preforms to be used for reheat pressing.

What is claimed is:

1. A method for the production of a glass optical element by press forming a glass gob which is manufactured from molten glass without cooling the glass gob to a room temperature, comprising:

a first step of receiving a mass of molten glass dropped, with a gas stream spouted under the mass of molten glass, to form the glass gob;

TABLE 1

| Example | Glass Temperature (°C.) (Equivalent viscosity: poises) | Die Temperature at the start of shaping (°C.) (Equivalent viscosity: poises) | Forming Pressure (kg/cm²) Initial Pressure | Forming Pressure (kg/cm²) Secondary Pressure | Forming time (sec) | Cooling Speed (°C./min) | Die Temperature at the time of release (°C.) (Equivalent viscosity: poises) | Shaped article of glass Profile irregularity | Shaped article of glass State of surface |
|---|---|---|---|---|---|---|---|---|---|
| 3 | 718° C. ($10^{5.5}$ poises) | 572° C. ($10^{11}$ poises) | 100 | 20 | 45 | 52 | 533° C. ($10^{13.4}$ poises) | ○ | ◉ |
| 4 | 718° C. — | 554° C. ($10^{12}$ poises) | " | " | 45 | 48 | 518° C. ($10^{14.5}$ poises) | ○ | ◉ |
| 5 | 686° C. ($10^{6.4}$ poises) | 614° C. ($10^{9}$ poises) | " | " | 45 | 108 | 533° C. ($10^{13.4}$ poises) | ◉ | ◉ |
| 6 | 686° C. ($10^{6.4}$ poises) | 592° C. ($10^{10}$ poises) | " | " | 40 | 89 | 533° C. ($10^{13.4}$ poises) | ◉ | ◉ |
| 7 | 686° C. ($10^{6.4}$ poises) | 572° C. ($10^{11}$ poises) | " | " | 35 | 93 | 518° C. ($10^{14.5}$ poises) | ◉ | ◉ |
| 8 | 686° C. ($10^{6.4}$ poises) | 554° C. ($10^{12}$ poises) | " | " | 30 | 72 | 518° C. ($10^{14}$ poises) | ◉ | ◉ |
| 9 | 658° C. ($10^{7.3}$ poises) | 639° C. ($10^{8}$ poises) | " | " | 45 | 147 | 529° C. ($10^{13.7}$ poises) | ◉ | ◉ |
| 10 | 658° C. ($10^{7.3}$ poises) | 592° C. ($10^{10}$ poises) | " | " | 35 | 108 | 529° C. ($10^{13.7}$ poises) | ◉ | ◉ |
| 11 | 658° C. ($10^{7.3}$ poises) | 572° C. ($10^{11}$ poises) | " | " | 25 | 113 | 525° C. ($10^{14.0}$ poises) | ◉ | ◉ |
| 12 | 620° C. ($10^{8.8}$ poises) | 602° C. ($10^{9.5}$ poises) | 200 | 40 | 65 | 103 | 525° C. ($10^{14.0}$ poises) | ◉ | ◉ |

Examples 3–11: Cooling started simultaneously with pressing, with initial pressure continued for 10 seconds.
Example 12: Cooling started after initial pressing of 20 seconds.

According to this invention, there is provided a method which can manufacture glass optical elements with high operational efficiency by closely matching the pace of production of glass gobs from molten glass with the paces of the other steps. This invention particularly can provide a direct a second step of keeping the glass gob afloat over a gas stream spouted so that said glass gob is adjusted to a temperature corresponding to a glass viscosity between $10^{5.5}$ and $10^9$ poises; and a third step of carrying out an unequal temperature pressing operation by pressing said glass gob at substantially said adjusted temperature into a shaped article of glass with a pair of forming dies which are kept at a first temperature corresponding to a glass viscosity of said glass gob between $10^8$ and $10^{12}$ poises and which is lower than the temperature of said glass gob, to remove the shaped article as the glass optical element from the forming dies when the temperature of the forming dies is lowered to a second temperature corresponding to a glass viscosity of at least $10^{13.4}$ poises.

2. The method claimed in claim 1, wherein the third step comprises the steps of press forming the glass gob within the forming dies kept at the first temperature, then cooling said forming dies, and releasing the shaped article of glass from said forming dies after the temperature of said forming dies is lowered to the second temperature corresponding to a glass viscosity of $10^{13.4}$ poises at a portion adjacent to the surface of the forming dies.

3. The method according to claim 1, wherein the temperature of said glass gob is adjusted at said second step to a temperature corresponding to a glass viscosity between $10^6$ and $10^8$ poises while said glass gob is pressed at said third step with said forming dies kept at a temperature corresponding to a glass viscosity between $10^9$ and $10^{12}$ poises.

4. The method according to claim 1, wherein said first step and said second step are carried out in individual receiving dies while said glass gob is transferred to the receiving die of said second step after completion of said first step.

5. The method according to claim 2, wherein said first step and said second step are carried out in individual receiving dies while said glass gob is transferred to the receiving die of said second step after completion of said first step.

6. The method according to claim 1, wherein said first and said second steps are carried out by the use of a common receiving die.

7. The method according to claim 1, wherein the third step lasts for a predetermined duration between 40 and 100 seconds.

8. The method according to claim 2, wherein the third step lasts for a predetermined duration between 40 and 100 seconds.

9. The method according to claim 4, wherein said second step is carried out by the use of a plurality of the receiving dies arranged for a single receiving die of the first step while said third step is carried out by the use of a plurality of the forming dies arranged for the single receiving die of the first step.

10. The method according to claim 9, wherein the glass gobs are produced in the first step every 2–10 seconds.

11. The method according to claim 9, wherein the glass gobs produced at the first step are partly subjected to processing different from the processing conducted in the second and the third steps.

12. The method according to claim 11, wherein a part of said glass gobs produced at said first step is used for a production of preforms.

13. The method according to claims 1, wherein said glass gob subjected to the temperature adjustment at said second step is dropped into the forming dies at which point said third step is conducted.

14. The method according to claim 1, wherein said third step comprises the steps of initially pressing the glass gob in said forming dies under a pressure between 10 and 300 kg/cm² for a period between 1 and 60 seconds and thereafter cooling said forming dies at a rate which is not less than 30° C./minute and which is not more than 200° C./minute.

15. The method according to claim 1, wherein said third step comprises the steps of initially pressing the glass gob in said forming dies under a pressure and secondarily pressing the glass gob in said forming dies at a pressure lower than that of said initial pressing.

16. The method according to claim 1, wherein said shaped article of glass is released from said forming dies at a temperature corresponding to a glass viscosity between $10^{13.4}$ and $10^{14.5}$ poises.

* * * * *